Jan. 25, 1966 J. R. BARNEY 3,231,321

CABINET

Filed Jan. 9, 1963

2 Sheets-Sheet 1

INVENTOR.
John R. Barney
BY Mueller & Aichele
Attys

INVENTOR.
John R. Barney
BY
Mueller & Aichele
Attys.

United States Patent Office 3,231,321
Patented Jan. 25, 1966

3,231,321

CABINET

John R. Barney, Glenview, Ill., assignor to Motorola, Inc., Chicago, Ill., a corporation of Illinois Filed Jan. 9, 1963, Ser. No. 250,385
2 Claims. (Cl. 312—7)

This invention relates generally to cabinet structures and in particular to cabinets used for housing television receivers.

As television receivers came into widespread use, the utility and appearance of television receiver cabinets became an important marketing factor for manufacturers to consider. Since a television receiver cabinet is generally an integral part of the furniture pattern of a home, it became necessary for television cabinets to have an appearance which would be compatible with the other furniture found in the home. However, styling and appearance were not the only factors to consider in such cabinets. The cabinets must also be sufficiently sturdy to accommodate the weight of receiver components. Further, as television receivers are sold in a highly competitive market, and as the cabinet represents a substantial part of the cost, the cabinet should preferably be relatively inexpensive to manufacture and assemble.

Television receiver cabinets having the desirable attributes of fine furniture have in the past, because of their size, posed a warehousing and transportation problem prior to the installation of the receiver chassis therein by the manufacturer. The storage, protection and necessary handling of quantities of these cabinets has added considerably to the manufacturing cost of television receivers, particularly those of the console type.

Accordingly, it is an object of the present invention to provide a sturdy television receiver cabinet which prior to assembly requires a minimum amount of storage space, and which may be easily assembled.

Another object of this invention is to provide a cabinet which is economical from a production standpoint because it is adapted to improved assembly techniques.

Still another object of the invention is to provide a cabinet which has an appearance associated with a custom made cabinet, but which may be readily mass produced.

A feature of the invention is the provision of an improved knockdown cabinet for a television receiver, which cabinet includes front and back panel sections with integral legs thereon and adapted to be secured together to compress a pair of side panel sections therebetween.

Another feature of the invention is the provision, in such a knockdown cabinet, of a plurality of elongated rods securing front and back panel sections in assembled relationship with the side panel sections, with the rods passing through or adjacent to the side panel sections.

In practicing the invention there is provided a knockdown television receiver cabinet having a front panel section which has an opening therein for the viewing screen of a television picture tube. The front panel section is provided with a pair of portions extending downwardly thereof. A rear panel section is also provided with similar leg portions. A pair of side panel sections have elongated ridges thereon which mate with grooves in the front and rear panel sections. Rigidity is imparted to the structure above described by means of a plurality of rods. Rods are passed through each of the two side panel sections near the top thereof, and are secured at each end in the front and rear panel sections respectively. A similar pair of rods extends between the front and rear panel sections just beneath the respective side panels. The rods are tensioned to bring the front and rear panel sections together securely against the side panel sections forming a rigid quadriplanar structure. The cabinet is completed by a top panel section and bottom panel section secured at the top and bottom of the quadriplanar structure respectively. It will be apparent that such a cabinet may be readily assembled, and in disassembled condition may be stored in a minimum of space.

Figure 1:
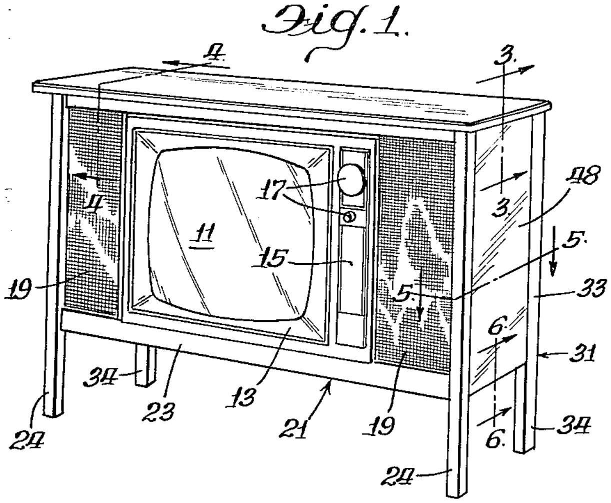
FIG. 1 is a perspective view of a television receiver cabinet constructed in accordance with the invention.

Referring now to FIG. 1, a television receiver is shown mounted in a cabinet constructed in accordance with the invention. View screen 11 of the television receiver is surrounded by a bezel 13, and an escutcheon panel 15 is mounted adjacent view screen 11 and contains controls 17 for operating the television receiver. Grill cloth 19 covers speakers mounted on either side of the front panel section as will be explained.

Figure 2:
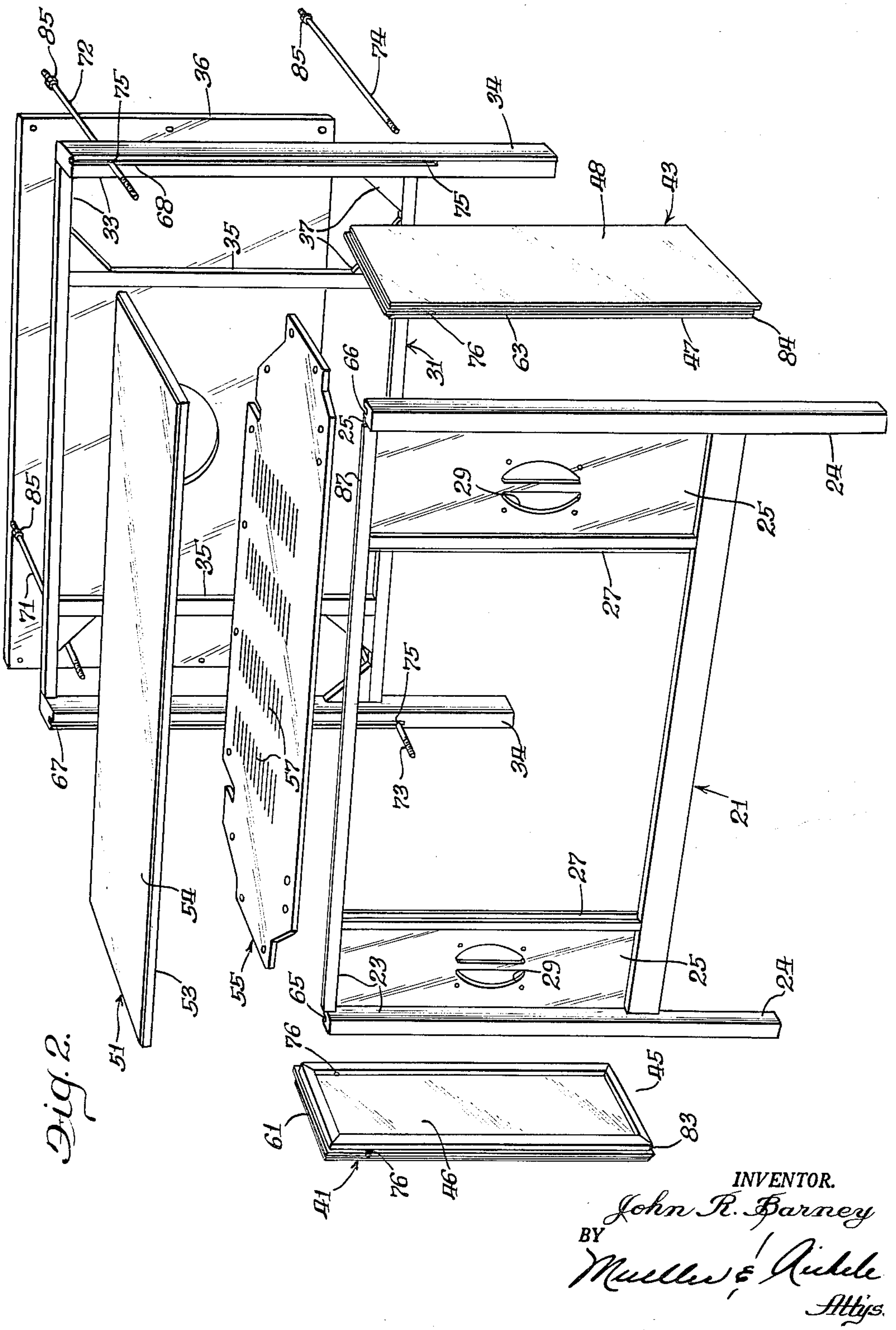
FIG. 2 is an exploded view depicting the structural aspects of the television receiver of FIG. 1.

Referring also now to FIG. 2, front panel section 21 is comprised of a rectangular frame 23 and a pair of leg portions 24. Baffle boards 25 extend between vertical struts 27 and the vertical portion of rectangular frame 23. Cutouts 29 are provided in baffle boards 25 for mounting the speakers of the television receiver, not shown.

Rear panel section 31 is generally of the same dimensions as front panel section 21. Rear panel section 31 is comprised of a rectangular frame 33 having integral leg portions 34. Vertical struts 35 extending between the top and bottom members of rectangular frame 33, and triangular blocks 37 fastened to rectangular frame 33 and vertical struts 35, serve to strengthen the rear panel section 31. A back cover panel 36 may be secured to panel section 31 to complete the same. This cover panel may be mounted once the television receiver is installed in the assembled cabinet.

Referring to FIGS. 2–6, a pair of side panel sections 41 and 43, mounting of which will be explained subsequently, are shown comprised of rectangular frames 45 and 47 respectively. Side panels 46 and 48 complete the side panel sections 41 and 43 respectively. A top panel section 51 is comprised of a rectangular frame 53 and top panel 54. A bottom panel section 55 includes air vent apertures 57 to aid cooling of the receiver components.

Provision is made for securing front and back panel sections 21 and 31 to side panel sections 41 and 43 in the following manner. Ridge portions 61 and 63 surround the top and sides of side panel sections 41 and 43 respectively. Grooves 65, 66, 67 and 68 are formed in front and back panel sections 21 and 31 respectively, for receiving portions of ridges 61 and 63 therein. Rods 71 and 72 extend through holes 75 in back panel section 31, through holes 76 in side panel sections 41 and 43 and into externally and internally threaded inserts 77 fitted in holes 78 in front panel section 21. Rods 73 and 74 extend through holes 75 in back panel section 31 and pass beneath the side panel sections 41 and 43 respectively into externally and internally threaded inserts 81 in holes 82.

Notches 83 and 84 are provided in side panel sections 41 and 43 respectively to provide clearance for rods 73 and 74. The rods 71, 72, 73 and 74 are tensioned by nuts 85 to squeeze the side panel sections 41 and 43 between front and rear panel sections 21 and 31 to form a rigid four-sided or quadriplanar structure.

Figure 3:
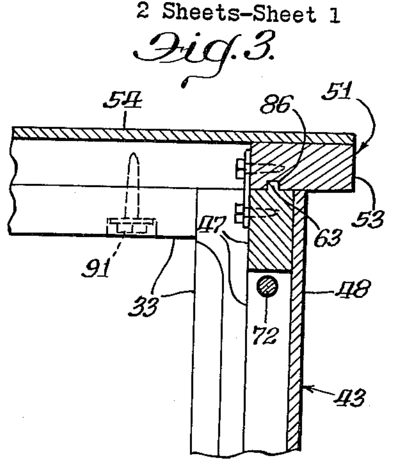
FIG. 3 is a sectional view taken along the line 3—3 of FIG. 1.
Figure 4:
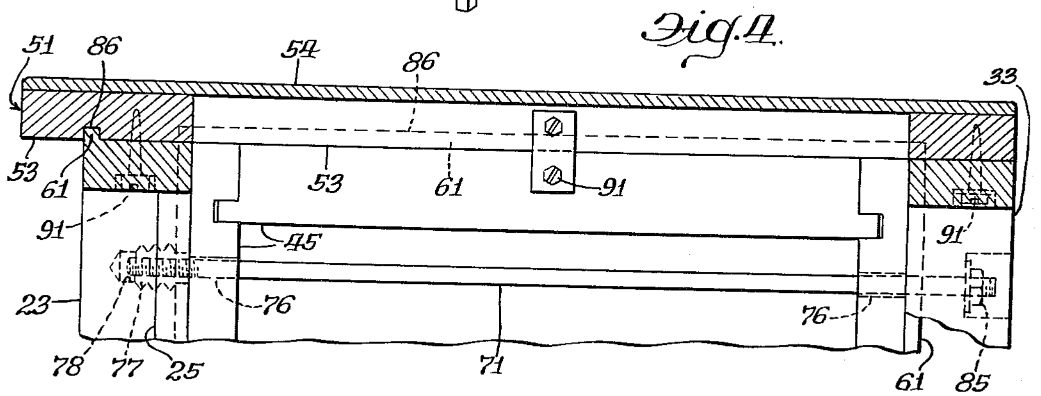
FIG. 4 is a sectional view taken along the line 4—4 of FIG. 1.

Referring now particularly to FIGS. 3 and 4, the mounting of top panel section to the above-described rigid four-sided structure is more clearly shown. Top panel section 51 contains grooves 86 beneath the leading edge and two sides thereof which mate with ridges 61 and 63 along the top of side panel sections 45 and 47 respectively. Grooves 86 also mate with ridge portion 87 in the top of front panel section 21. The top is secured to the front, back and side panel sections by screws 91.

Figure 5:
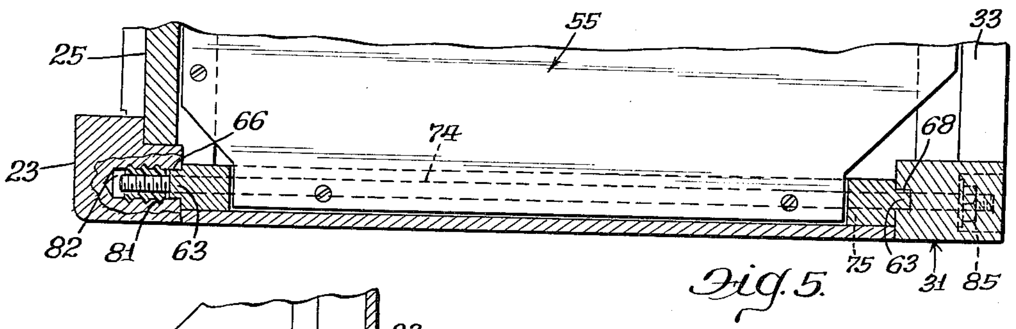
FIG. 5 is a sectional view taken along the line 5—5 of FIG. 1.
Figure 6:
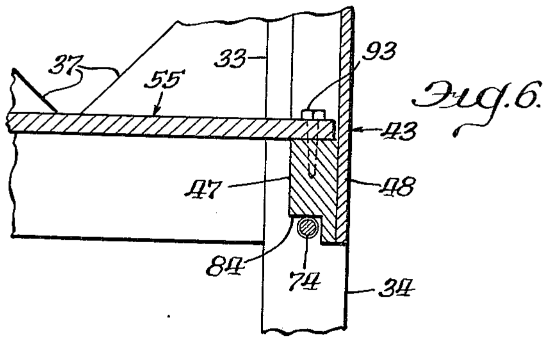
FIG. 6 is a sectional view taken along the line 6—6 of FIG. 1.

Referring now particularly to FIGS. 5 and 6, the mounting of bottom panel section 55 is more clearly shown. The bottom panel section sits flush against the inner-surface of the lower portion of side frames 45 and 47 and is screwed thereto by screws 93.

The construction of the cabinet as previously described readily lends itself to assembly with mass production techniques. That is, the various sections may be made interchangeable and hence may be manufactured by specialized techniques in large numbers. Then, with large numbers of interchangeable parts available, typical assembly line techniques may be used in putting the cabinets together. The construction of the various sections, as shown and described herein makes further finishing or other exterior modifications of the assembled cabinets unnecessary. Front and rear panel sections 21 and 31 may be spaced at the proper distance, and side panel sections 41 and 43 may then be put into position with ridges 61 and 63 sliding in grooves 65, 66, 67 and 68. Rods 71, 72, 73 and 74 may then be inserted and tensioned to form a rigid quadriplanar structure. Bottom panel section 55 may then be dropped down and secured in place, and finally top panel section 52 may be fitted on ridges 87, 61 and 63 and also screwed in position. The components of the television receiver may be inserted through the center opening in back panel section 31, and a back panel 36 may be screwed into position to enclose the cabinet.

When knocked down, the various panel assemblies which form the cabinet may be stored in a flat position. This takes up little space, making the cabinets easy to store, ship and handle. The elements of the assembled cabinet are secured together by means inside of the cabinet with no means of fastening visible on the exterior. This minimizes exterior blemishes and the need for finishing work on assembled cabinets. The individual sections are small and hence easy to handle and finish in large quantities. Finally, as previously pointed out, the cabinet of the invention lends itself readily to mass production techniques, substantially reducing the cost of the completed cabinets.

Accordingly, the invention provides a readily assembled cabinet which, when disassembled, requires a minimum amount of storage space. Furthermore, the cabinet is economical from a production standpoint because of its adaptability to improved assembly techniques, and provides an attractive appearing, sturdily constructed enclosure for a television receiver.

I claim:

1. A knock down cabinet for a television receiver, including in combination, a front panel section having leg portions thereon and further having an opening therein for the viewing screen of a television picture tube, said front panel section having a pair of vertically aligned threaded inserts extending into the inner face at each end thereof, a rear panel section having leg portions thereon and further having two pairs of openings therein in alignment with said threaded inserts in the inner face of said front panel section, a pair of side panel sections transversely extending between said front and rear panel sections at respective ends thereof, each of said side panel sections being formed of a panel with a rectangular frame on the inner face against the periphery thereof, said side panel sections having ridge portions on the edges thereof, said front and rear panel sections having elongated grooves therein mating with said ridge portions on said side panel sections, a first pair of rods transversely extending between said front and rear panel sections to secure the same against said pair of side panel sections, each of said first pair of rods passing through said rectangular frame of a respective one of said side panel sections proximate the upper end thereof, a second pair of rods transversely extending between said front and rear panel sections to secure the same against said pair of side panel sections, each of said second pair of rods passing proximate the lower end of a respective one of said side panel sections, said first and second pairs of rods engaging said threaded inserts and passing through said openings to secure said panel sections to each other to form a rigid quadriplanar structure, a ridge portion extending along the top of said front panel section, a top panel section joined to said quadriplanar structure at the top thereof, said top panel section having grooves therein mating with said ridge portions on said front and side panel sections, and a bottom panel section joined to said quadriplanar structure at the bottom thereof to form a cabinet, said cabinet thereby being adapted to mass production assembly techniques with all of said sections being thin and easily stored piror to assembly.

2. A knock down cabinet, including in combination, a front panel section having leg portions thereon, said front panel section having a pair of vertically spaced threaded inserts extending into the inner face at each end thereof and concealed from view at the outer face thereof, a rear panel section having leg portions thereon and further having two pairs of openings therein in alignment with said threaded inserts in the inner face of said front panel section, a pair of side panel sections transversely extending between said front and rear panel sections at respective ends thereof, each of said side panel sections being formed of a panel with a rectangular frame on the inner face adjacent the periphery thereof, said side panel sections having ridge portions on the edges thereof, said front and rear panel sections having elongated grooves therein mating with said ridge portions on said side panel sections, a first pair of rods transversely extending between said front and rear panel sections to secure the same against said pair of side panel sections, each of said first pair of rods passing through said rectangular frame of a respective one of said side panel sections proximate the upper end thereof, a second pair of rods transversely extending between said front and rear panel sections to secure the same against said pair of side panel sections, each of said second pair of rods passing through said frame of a respective one of said side panel sections, said first and second pairs of rods engaging said threaded inserts and passing through said openings to secure said panel sections to each other to form a rigid quadriplanar structure, a ridge portion extending along the top of said front panel section, a top panel section secured from within said quadriplanar structure at the top thereof, said top panel section having grooves therein mating with said ridge portions on said front and side panel sections, and a bottom panel section joined to said quadriplanar structure at the bottom thereof to form a cabinet, said cabinet thereby being adapted to mass production assembly techniques with all of said sections being thin and easily stored prior to assembly and being prefinished to minimize further finishing after assembly.

References Cited by the Examiner

UNITED STATES PATENTS

| | | | |
|---|---|---|---|
| 757,282 | 4/1904 | Diers | 312—265 X |
| 789,490 | 5/1905 | De Haven | 217—12 |
| 828,133 | 8/1906 | Morrison | 312—265 |

(Other references on following page)

UNITED STATES PATENTS

| | | | |
|---|---|---|---|
| 868,310 | 10/1907 | White | 312—265 |
| 873,555 | 12/1907 | Kearns | 312—265 X |
| 1,569,832 | 1/1926 | Byrne | 312—138 X |
| 1,854,345 | 4/1932 | Morin | 312—265 X |
| 1,909,441 | 5/1933 | Wendell | 217—12 |
| 1,933,074 | 10/1933 | Richardson | 312—7 X |
| 2,158,641 | 5/1939 | Stenberg | 312—7 |
| 2,427,012 | 9/1947 | Lum | 312—265 |
| 2,743,835 | 5/1956 | Looney | 217—12 |

FOREIGN PATENTS

| | | |
|---|---|---|
| 920,659 | 1/1947 | France. |
| 1,121,956 | 5/1956 | France. |
| 352,432 | 1/1930 | Great Britain. |

FRANK B. SHERRY, *Primary Examiner.*